US006971865B2

(12) United States Patent
Prue

(10) Patent No.: US 6,971,865 B2
(45) Date of Patent: Dec. 6, 2005

(54) MANIFOLD FOR REGULATING THE FLOW OF PLASTIC TO AN EXTRUSION DIE

(75) Inventor: James M. Prue, Griswold, CT (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 271 days.

(21) Appl. No.: 10/316,674

(22) Filed: Dec. 11, 2002

(65) Prior Publication Data

US 2004/0115293 A1 Jun. 17, 2004

(51) Int. Cl.⁷ .............................................. B29C 47/12
(52) U.S. Cl. ............................. 425/192 R; 425/382 R; 425/382.4
(58) Field of Search ........................... 425/113, 133.5, 425/190, 191, 192 R, 462, 382 R, 382.4, 425/463

(56) References Cited

U.S. PATENT DOCUMENTS 5,980,226 A * 11/1999 Guillemette ................. 425/113

* cited by examiner

*Primary Examiner*—Joseph S. Del Sole
(74) *Attorney, Agent, or Firm*—Perman & Green, LLP

(57) ABSTRACT

A manifold is connected between an extruder and the associated die assembly to supply plastic flow to the die. The output from the extruder is split into multiple passages in which each manifold passage supplies plastic flow to an extrusion passage within the die assembly. An adjustable throttle valve is positioned within each manifold passage to regulate the flow volume through the manifold passage, thereby controlling the output of the die assembly.

5 Claims, 4 Drawing Sheets

MANIFOLD FOR REGULATING THE FLOW OF PLASTIC TO AN EXTRUSION DIE

BACKGROUND OF THE INVENTION

1. Field of the Invention

The present invention relates to an assembly for regulating the volume of flow of molten plastic material from an extruder to a die having multiple flow passages.

2. Brief Description of Related Developments

In certain circumstances it is necessary to supply multiple passages of an extrusion die with molten plastic material. This is accomplished in many instances by providing separate extruders for the inlet of each of the multiple passages. This may be cumbersome where there are closely adjacent multiple passages and unnecessary where several of the flow passages are intended to use the same material.

It is an object of this invention to provide an inlet manifold connected to a single extruder which is constructed to split the outflow of the extruder into multiple extrusion passages of an extrusion die assembly.

Multiple passages are generally used to feed multiple extrusion channels which extrude separate products, concentric layers, or other configurations. In such circumstances, it is sometimes difficult to maintain an even flow volume in adjacent passages because of uneven temperature distribution and other factors. This may result in an imbalance in output. This imbalance can cause problems in post extrusion processing.

It is the purpose of this invention to provide a manifold which includes an adjustable throttle valve to regulate the flow volume in the extrusion passages supplied by the extruder.

SUMMARY OF THE INVENTION

An input manifold is constructed with an inlet for receiving molten plastic material from an extruder. The inlet splits the flow into several flow passages, at least two, to supply flowing plastic to the extrusion passages of a die assembly. The extrusion passages direct the flowing plastic to the die outlets of the assembly. The manifold is constructed having spaced adjacent upstream and downstream sections. The manifold sections have aligned passages for receiving and transmitting the flowing plastic. Each passage of the downstream section is constructed with a stationery valve stem positioned along the axis of the passage and having a conically shaped upstream facing surface.

A valve body is constructed to be mounted in each of the passages and includes an axial channel. The valve body is mounted to slidably engage the aligned passages of both the upstream and downstream sections, thereby bridging the gap between the manifold sections. The downstream end of the valve body channel is constructed with a conical valve seat to receive the upstream facing surface of the valve stem. The outer surface of the valve body is constructed with threads for engaging a mating threaded portion of the aligned passage of the upstream manifold section.

The downstream manifold section is attached to the die assembly by screws with the valve stems in place within the manifold section passages. The valve bodies are assembled by positioning the valve body assembly so that the valve bodies fit into the passages of the downstream manifold section. To complete the assembly the upstream manifold section is positioned to engage the valve bodies and receive the threads thereof. The outer surface of the valve body may be constructed with flats to allow the application of a torque manually or with an appropriate tool. Through the use of an engaged tool, each of the valve bodies may be turned to further engage the threads in the threaded passage of the upstream manifold section. Axial movement of the valve body will adjust the clearance between the valve stem and the valve seat and thereby regulate the flow volume in a particular passage.

BRIEF DESCRIPTION OF THE DRAWINGS

The manifold assembly of this invention is explained in more detail below with reference to the accompanying drawing, in which:

FIG. 4b is an end view of the valve stem of FIG. 4a; and

DESCRIPTION OF THE PREFERRED EMBODIMENT

Figure 1:
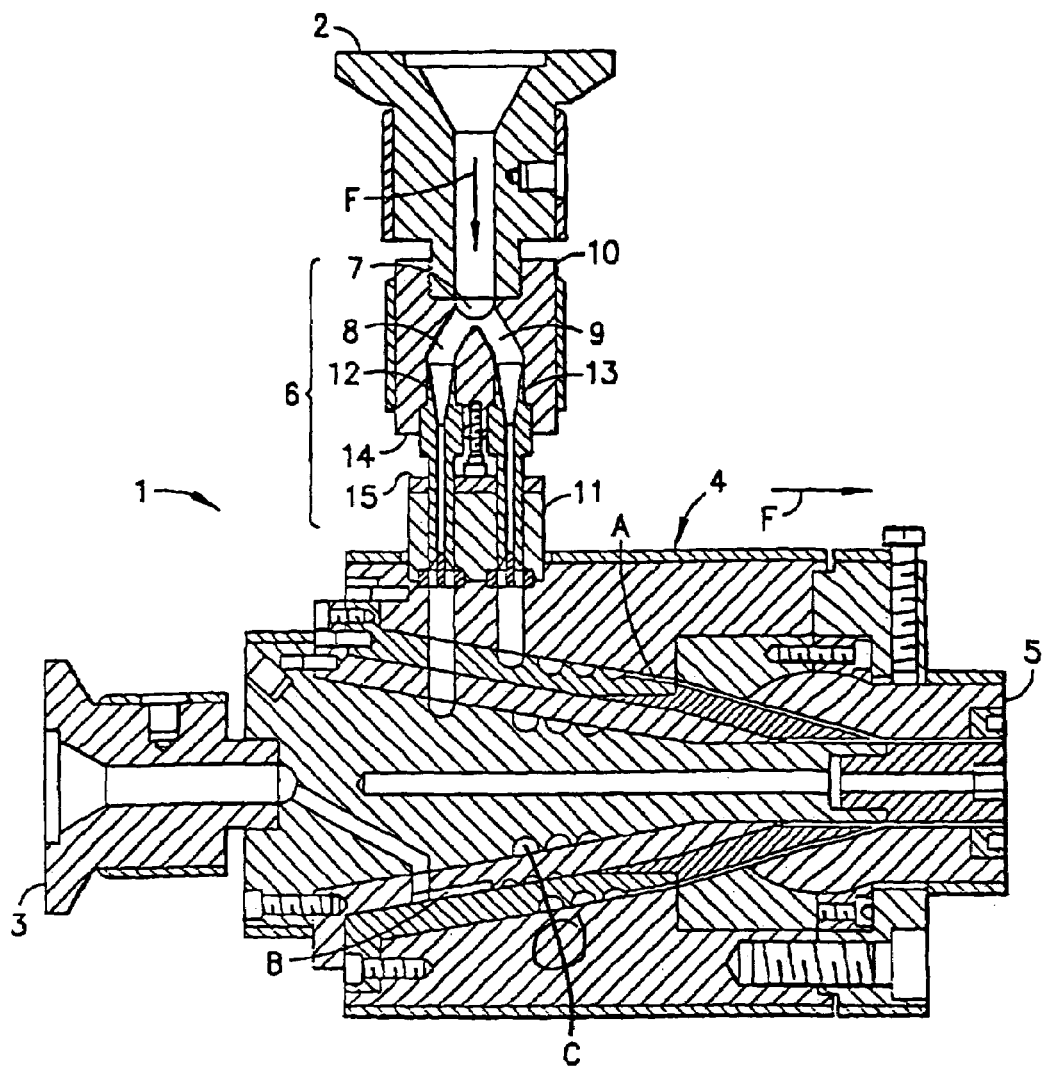
FIG. 1 is a cross section al view of an extrusion die with a regulated supply according to this invention.

To illustrate the construction of this invention, an extrusion system 1 is shown in FIG. 1. The system 1 consists of extruders (not shown) having feeds 2 and 3 which supply molten plastic to die assembly 4. In die assembly 4 extrusion passages A, B, and C carry the molten plastic to die element 5 where it exits as a multilayered tubular product. As shown, passages A and C are supplied by extruder feed 2 and extrusion passage B is supplied by extruder feed 3. The extrusion system 1 can take many different forms having two or more passages to be supplied by a single extruder. Another type of extrusion system is shown, for example, in the alternative embodiment of FIG. 4. In this system the products are not coaxially layered products, but products that are extruded side by side. Each embodiment features multiple plastic flow passages which feed separate die outlets.

In order to provide multiple flows from a single extruder feed, in particular the two flows in the embodiment shown in FIG. 1, from, extruder feed 2, an input manifold 6 is constructed with an inlet 7 for receiving molten plastic material from extruder feed 2. The inlet 7 splits the flow into a pair of flow passages 8 and 9. Flow passages 8 and 9 are connected to supply flowing plastic to the extrusion passages A and C of a die assembly 4. The plastic flow joins in die element 5 to form a multilayered extruded tubular product. Plastic flow through the manifold is from the upstream feed 2 downstream towards the die element 5 as shown by arrows F.

The manifold 6 is constructed of sections 10 and 11 through which the flow passages 8 and 9 extend. The upstream section 10 connects to extruder feed 2 at inlet 7. The manifold sections 10 and 11 are connected by means of a pair of valve bodies 12 and 13, which, as shown in FIG. 1, are threaded into enlarged portions of flow passages 8 and 9 at the surface 14 of upstream manifold section 10. Similar openings to flow passages 8 and 9 are formed in the adjacent surface 15 of downstream manifold section 11 to receive the downstream end of valve bodies 12 and 13. Valve bodies 12 and 13 have drilled flow passages axially extending through the length of the body to connect the adjoining portions of manifold flow passages 8 and 9.

Figure 3:
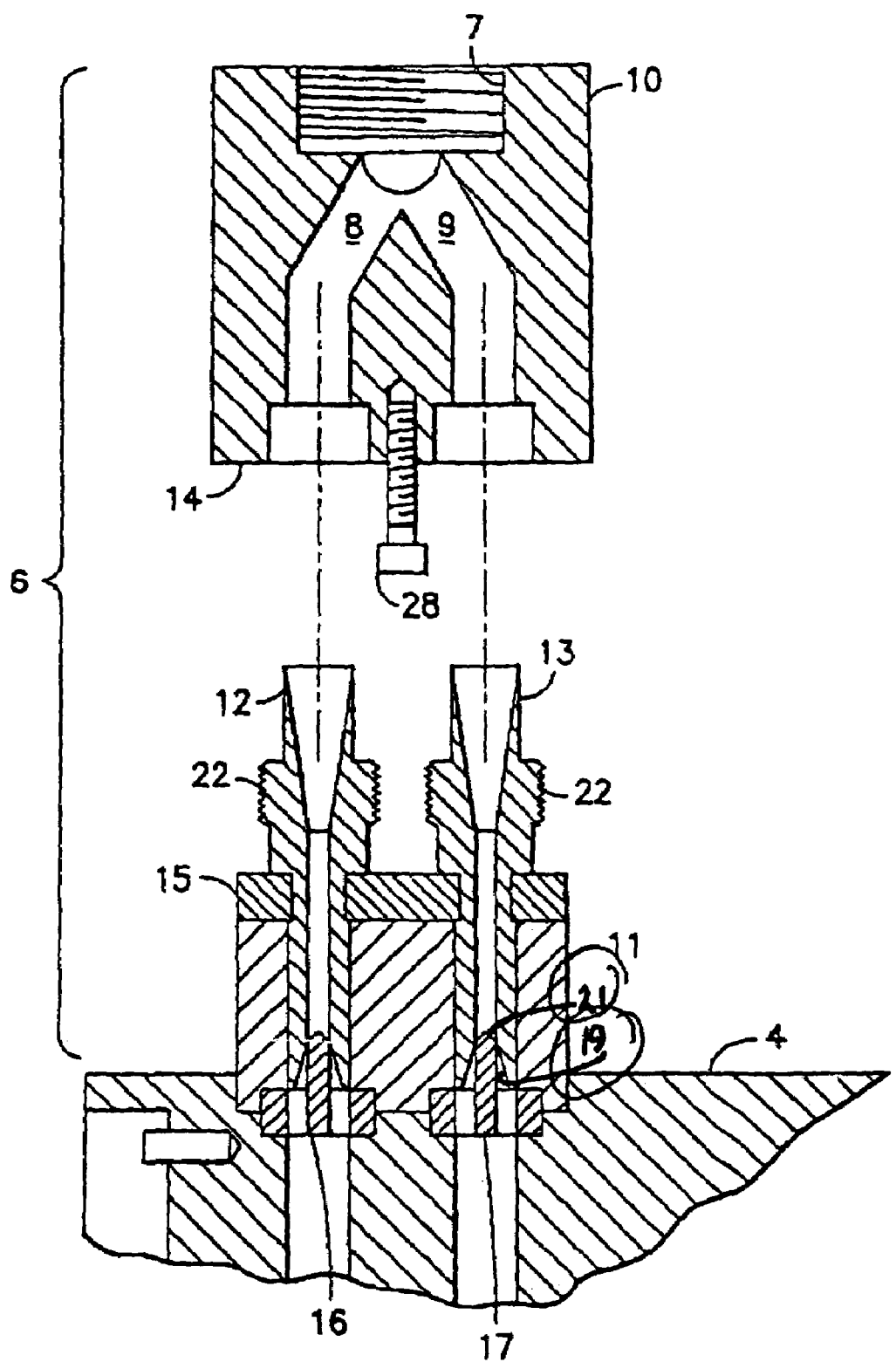
FIG. 3 is a sectional view of the manifold of this invention.

As best shown in FIG. 3, the portions of the passages 8 and 9 within the downstream section 11 contain stationery valve stems 16 and 17 positioned along the axis of the respective passage. The valve bodies and valve stems combine to form valve assemblies 30 to provide an adjustable throttle action to the plastic flow with in the passages 8 and 9.

Figure 4A:
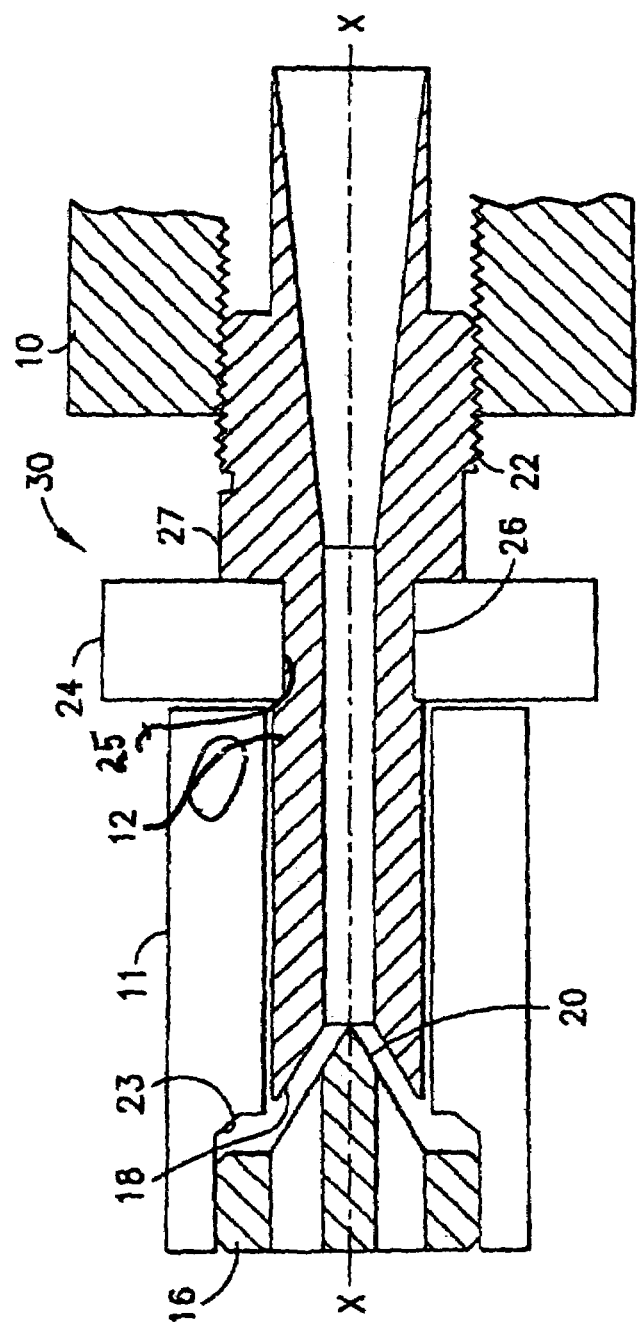
FIG. 4a is a sectional view of the valve stem and valve body of this invention.
Figure 4B:
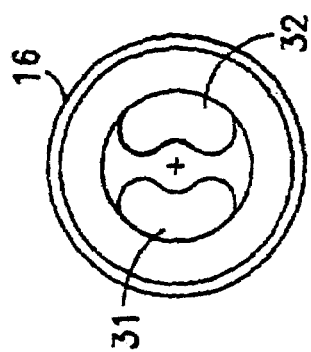

Valve assembly 30 is shown in FIG. 4a and consists of a valve body 12 and a valve stem 16. Valve body 12 is constructed with a conical seat portion 18 and valve stem 16 is constructed with conically shaped upstream facing surface 20. Valve body 13 is constructed identically having a seat portion 19 and similarly valve stem 17 would have an engaging surface 21. The bodies and stems are positioned in the passages 8 and 9 in axially alignment and are mounted for relative sliding motion within the passages. The relative motion provides an adjustable throttling of the plastic flow in the respective passage. As shown in FIG. 4b, valve stem 16 has internal passages 31 and 32 which connect to the manifold passages 8 and 9 within the downstream manifold section. Valve stem 17 is constructed similarly.

Figure 2:
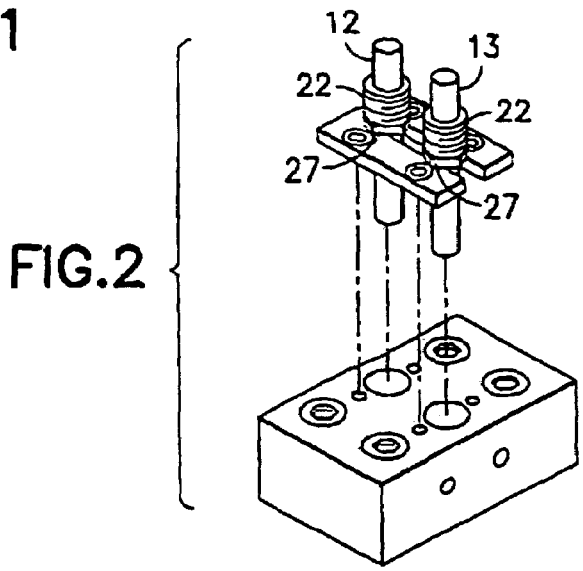
FIG. 2 is an exploded perspective view of a valve body and downstream manifold according to this invention.

In order to connect the valve bodies 12 and 13 between the upstream and downstream manifold sections 10 and 11 respectively, each of the external surfaces of the valve bodies 12 and 13 is constructed with threads 22 to engage mating threads in the receiving portion of the passages of upstream section 10. At the downstream end of threads 22, suitable flats 27 are formed to provide a torque transmitting surface, such as the fixed hexagon nut shown in FIG. 2. Valve stem 16 may be assembled within a countersunk portion 23 of passage 8, as shown in FIG. 4a. As an alternative, threads 22 could be constructed for engagement with mating threads in the receiving portion of the downstream manifold 11. In this instance the valve bodies would merely be inverted from the position shown in FIG. 3.

To facilitate assembly, a retaining plate 24 is provided which can be attached to the face 15 of the downstream manifold section 11 by screws (not shown). A central slot 25 extends substantially the length of the retaining plate 24 to receive the valve bodies 12 and 13 at a mating land 26 on the exterior of the valve bodies.

It is necessary that the valve bodies and valve stems be mounted to provide relative axial motion. In this manner the conical surfaces 18 and 19 can adjust between partial and full engagement to provide a variable throttling of the plastic flow. To accomplish this, sufficient thread length must be constructed within the receiving portions of passages 8 and 9 in the upstream section 10 of the manifold 6 to allow sufficient range of movement of the valve bodies 12 and 13.

To assemble the manifold 6 within the extrusion system 1, the downstream manifold section 11 is attached to the die assembly by screws with the valve stems 16 and 17 in place within the downstream manifold section passages. The valve bodies 12 and 13 are assembled by engaging the retaining plate 24 and positioning the retaining plate and valve body assembly so that the valve bodies fit into the passages of the downstream manifold section. The retaining plate 24 is then secured to the face 15 of the downstream section 11 by screws. To complete the assembly the upstream manifold section is positioned to engage the valve bodies and receive the threads thereof. The torque transmitting surface 27 of the valve bodies may consist of flats to accommodate a tool. Through the use of an appropriate tool, such as a crescent or spanner wrench, each of the valve bodies 12 and 13 may be turned about its axis x—x to further engage the threads 22 in the threaded passage of the upstream manifold section 10. It is important to maintain a gap between the manifold sections 10 and 11 to insure access to the valve adjustment mechanism. This is accomplished by cap screw 28 extending between the adjacent faces 14 and 15 of the manifold sections. The gap allows a clearance for the axial movement of a valve body in its respective aligned passage. Axial movement of the valve bodies 12 and 13 relative to the valves stems 16 and 17 will adjust the clearance between the valve stem and the valve seat and thereby regulate the flow volume in a particular passage.

Figure 5:
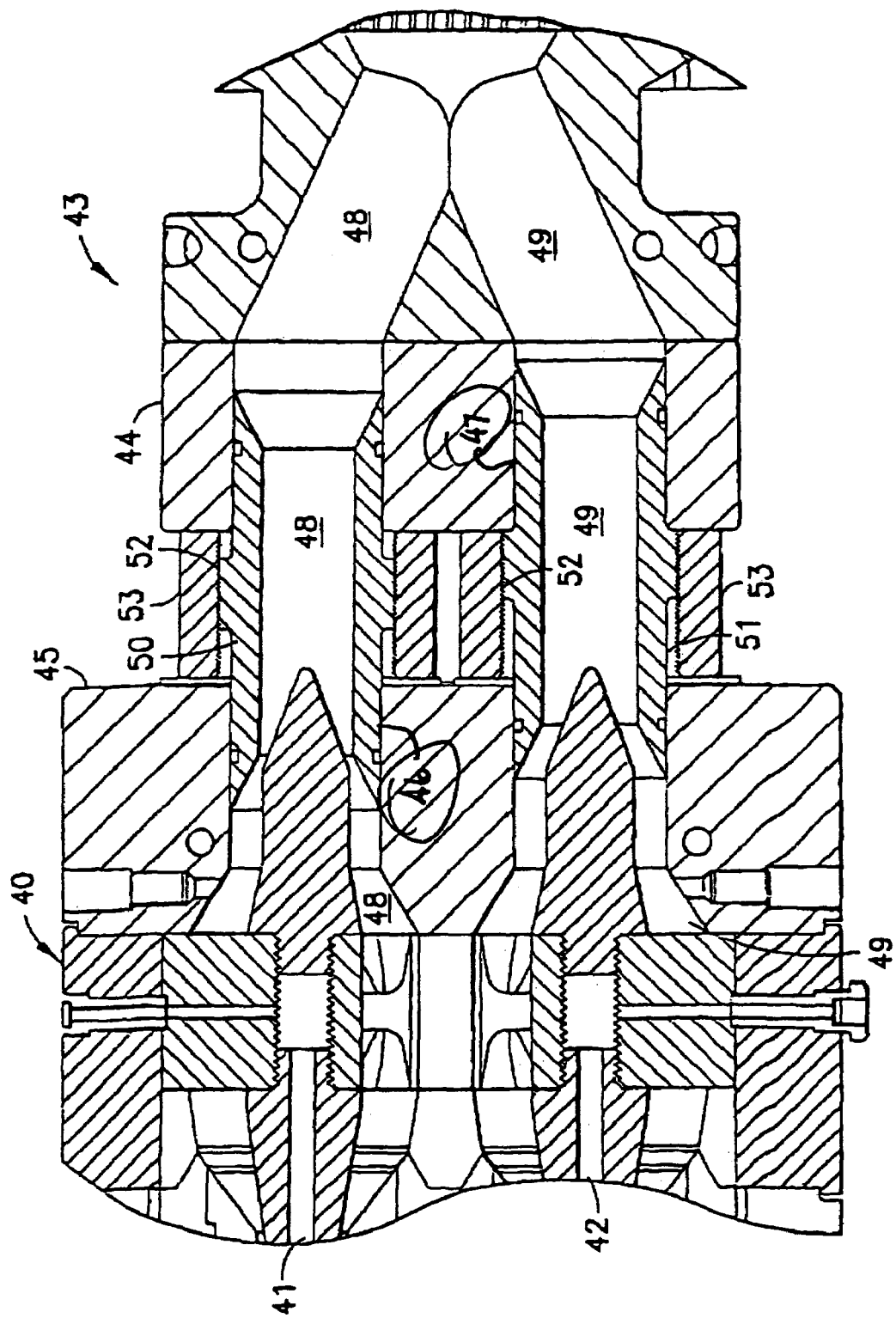
FIG. 5 is a sectional view of an alternate embodiment of this invention.

An alternative embodiment is shown in FIG. 5 in which the extrusion die assembly 40 is designed to extrude product in parallel passages 41 and 42 each having a die outlet (not shown) positioned side by side. The products of this type of die are often subjected to post extrusion drawing which requires an even flow of product from the die. Regulating manifold 43 is positioned to receive flowing plastic from an extruder and to distribute the flowing plastic to passages 41 and 42 through manifold passages 48 and 49. Manifold 43 is constructed in two sections 44 and 45 similarly to the first embodiment. Each section is constructed with connecting passages which communicate to form the through passages 48 and 49. Downstream section 45 is connected to the die assembly with valve stems 46 and 47 in place.

The mating passages of the upstream and downstream sections of the manifold are connected by means of valve bodies 50 and 51 which are constructed with axial passages to interconnect the manifold passages. In this embodiment, upstream and downstream ends of the valve bodies 50 and 51 are slid into engagement with the respect passage openings of the manifold passages 48 and 49. The exposed portion of the external surface of the valve bodies are formed with threads 52. An annular threaded washer 53 is assembled over the threads 52. Rotation of washer 53 about its axis will cause movement of the valve bodies 50 and 51 along their longitudinal axis x—x. In the assembled position, the valve bodies engage the valve stems 46 and 47 and will throttle the flow of molten plastic through the manifold passages 48 and 49 in a manner similar to the first embodiment. In this manner the flow of plastic from a single source can be distributed into multiple extrusion passages of a die assembly, while regulating the flow volume in each of the extrusion passages.

In the above description, it should be understood that the die assemblies shown are for illustration only and do not form part of this invention which can be used in a wide variety of applications in which there is a need to provide a regulated flow from a single extruder to multiple extrusion channels.

I claim:

1. A manifold for distributing flowing plastic from an extruder to multiple extrusion passages of an extrusion die assembly comprising:

an upstream manifold section having an inlet for receiving said flowing plastic from said extruder, said upstream manifold section constructed with at least two distribution passages each of said passages extending from said inlet to an outlet in a downstream face of said upstream manifold section;

a downstream manifold section constructed with at least two distribution passages for receiving flowing plastic from said upstream manifold section, each of said passages extending from an inlet in an upstream face of said downstream manifold section to an outlet in a downstream face of said downstream manifold section, said downstream manifold section connected to said extrusion die assembly to supply flowing plastic to the passages thereof;

a valve mounted in each of said at least two manifold distribution passages, constructed with an internal passage extending from an upstream opening to a downstream opening, said valves mounted to connect the distribution passages of said upstream and downstream manifold sections to form continuous passages; and wherein said valves are constructed to selectively restrict the flow of plastic within its internal passage, and wherein said valves are independently adjustable to allow independent regulation of the plastic flow through said manifold distribution passages.

2. A manifold for distributing flowing plastic from an extruder to multiple extrusion passages of an extrusion die assembly, as described in claim 1, wherein said valves further comprise:

a valve body constructed with an internal passage extending from an upstream opening to a downstream opening and having a valve seat constructed in one of said openings, said valve body mounted to connect the distribution passages of said upstream and downstream manifold sections to form continuous passages;

a valve stem mounted in the manifold distribution passages for engagement with the valve seat of valve body; and wherein said valve body and said valve stem are mounted for relative axial movement, said movement being externally actuated to adjustably throttle the flow volume in said manifold distribution passages.

3. A manifold for distributing flowing plastic from an extruder to multiple extrusion passages of an extrusion die assembly, as described in claim 2, wherein said valve body is constructed with external threads and are connected to one of said manifold sections by engagement of said threads with mating threads constructed in the passage opening of said connected manifold section, said valve body being axially moveable by rotation of said valve body on said threads.

4. A manifold for distributing flowing plastic from an extruder to multiple extrusion passages of an extrusion die assembly, as described in claim 2, wherein said valve body is constructed with external threads and, further comprising an annular washer axially fixed and mounted for rotation between said manifold sections, said annular washer being internally threaded; and wherein said valve body extends through said annular washer with the threads of the valve body engaging the internal threads of said washer, said valve body being axially moveable on said threads by rotation of said annular washer.

5. A manifold for distributing flowing plastic from an extruder to multiple extrusion passages of an extrusion die assembly comprising:

a manifold body having an inlet for receiving said flowing plastic from said extruder, said manifold body constructed with at least two distribution passages each of said passages extending from said inlet to an outlet in a downstream face of said manifold body;

said at least two distribution passages being connected to said extrusion die assembly to supply flowing plastic to the passages thereof;

a valve mounted in each of said at least two manifold distribution passages, constructed with an internal passage extending from an upstream opening to a downstream opening, said valves mounted to form continuous passages with said distribution passages; and wherein said valves are constructed to selectively restrict the flow of plastic within its internal passage, and wherein said valves are independently adjustable to allow independent regulation of the plastic flow through said manifold distribution passages.

* * * * *